(12) United States Patent
Bhandari et al.

(10) Patent No.: US 9,491,406 B2
(45) Date of Patent: Nov. 8, 2016

(54) SEAMLESS ESCALATION OF MESH VIDEOCONFERENCES TO BRIDGED VIDEOCONFERENCES

(71) Applicant: Polycom, Inc., San Jose, CA (US)

(72) Inventors: Ankit Bhandari, Rajasthan (IN); Tim Lynch, San Francisco, CA (US); Tiju Titus John, Bangalore (IN)

(73) Assignee: Polycom, Inc., San Jose, CA (US)

( * ) Notice: Subject to any disclaimer, the term of this patent is extended or adjusted under 35 U.S.C. 154(b) by 0 days.

(21) Appl. No.: 14/923,230

(22) Filed: Oct. 26, 2015

(65) Prior Publication Data

US 2016/0119583 A1 Apr. 28, 2016

(51) Int. Cl.
*H04N 7/15* (2006.01)
(52) U.S. Cl.
CPC .................... *H04N 7/152* (2013.01)
(58) Field of Classification Search
USPC ...................................... 348/14.09
See application file for complete search history.

(56) References Cited

U.S. PATENT DOCUMENTS

| | | | |
|---|---|---|---|
| 2011/0187814 A1* | 8/2011 | Nimri | G10L 21/00 348/14.09 |
| 2015/0103137 A1* | 4/2015 | Eisenberg | H04N 7/152 348/14.09 |
| 2015/0288926 A1* | 10/2015 | Glass | H04N 5/265 348/14.09 |

* cited by examiner

*Primary Examiner* — Creighton Smith
(74) *Attorney, Agent, or Firm* — Blank Rome, LLP

(57) ABSTRACT

Techniques allow seamless transitioning of a mesh-based videoconference to a bridged videoconference. Criteria are defined for use in a triggering point function that may be evaluated to determine whether to make the transition. Escalation logic in an escalation manager may be used to manage the transition, allowing some participants to connect via a multipoint control unit, which is in turn a participant in the mesh-based videoconference, with the escalation manager relaying media streams from the mesh-connected participants. The mesh-connected participants may then drop their mesh connections without disruption to the videoconference. Escalation logic in the endpoints may be used as an alternate to an escalation manager unit.

16 Claims, 7 Drawing Sheets

US 9,491,406 B2

SEAMLESS ESCALATION OF MESH VIDEOCONFERENCES TO BRIDGED VIDEOCONFERENCES

TECHNICAL FIELD

The present invention relates to the field of videoconferencing, and in particular to a technique for escalating an ongoing mesh videoconferencing session to a bridged videoconferencing session without interrupting the videoconference.

BACKGROUND ART

In a multi-party conference call in meshed mode all the participants send their media to each other directly. If this meshed call is escalated to a bridged mode, due to legacy endpoints joining the conference or exceeding the maximum number of participants in meshed mode, then all the participants in the existing conference call are forced to join the conference call on an Audio/Video Bridge such as a multipoint control unit (MCU). This transition from a meshed call to a bridged call creates a disruption in the active conference. This escalation or transition sometimes takes a significant amount of time, producing a blackout period in the conference call. Thus, users may experience discontinuity in the video and audio streams of their conference call when escalation happens.

Since network and device capabilities are changing rapidly, the criteria to decide when to convert a mesh call to a bridge call can be very dynamic. Currently the criteria are mainly the number of participants. With the increase in the network bandwidth, and the use of mobile endpoints and standards like WEBRTC ("Web Real-Time Communication") there are other factors that can affect the user experience in a meshed-based conference call. This can create very bad experiences for users if their device is not capable of supporting the number of streams needed for the conference or the network conditions are not good.

BRIEF DESCRIPTION OF DRAWINGS

The accompanying drawings, which are incorporated in and constitute a part of this specification, illustrate an implementation of apparatus and methods consistent with the present invention and, together with the detailed description, serve to explain advantages and principles consistent with the invention. In the drawings.

DESCRIPTION OF EMBODIMENTS

Figure 1:
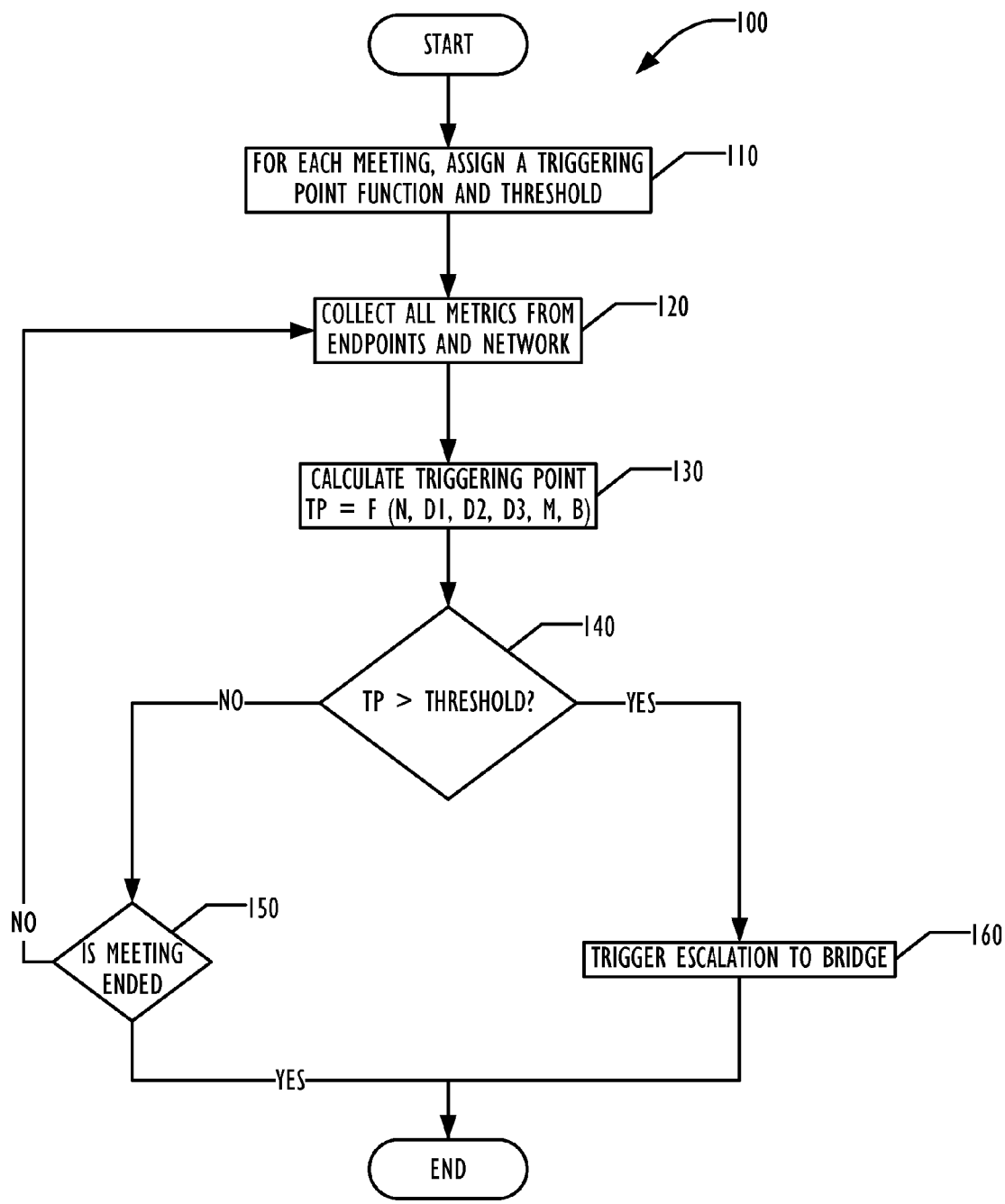
FIG. 1 is a flowchart illustrating a technique for triggering escalation of a mesh-based conference to a bridged conference according to one embodiment.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "a computer system" can refer to a single computer or a plurality of computers working together to perform the function described as being performed on or by a computer system.

In the following description, the conference call or conference session may be either audio-only, video-only, or a mixture of audio and video. In addition, although not illustrated in the Figures for clarity, data-only streams may be provided in the conference session. The terms "call" and "session" are used synonymously herein.

The description below lists a variety of metrics to be considered to identify the triggering point for converting from a mesh conference to a bridged conference. A mechanism is proposed to collect the metrics and calculate a weighted index of the criteria so the triggering point can be derived.

In a meshed based conference call, each participant has to establish a separate media connection with each other participant. This consumes lot of CPU cycles/processing power on device. It also consumes lot of network bandwidth.

The following are some example criteria to be considered when deciding on an escalation to a bridge call.

1. Number of participants in the meeting. (N)

As more participants join the conference, the number of media streams maintained by each endpoint will increase. This may create a bad user experience when the number of streams approaches or exceeds the capacity of an endpoint.

2. Device bandwidth limitation for the meshed user. (D1)

In some scenarios, the endpoint capacity is sufficient for a mesh call, but network bandwidth or quality limitations may produce negative results. In such a scenario, handling multiple media connections in that network can be a problem.

3. Device computational limitation for the meshed user. (D2)

Mobile devices comes with a wide range of capacity. For example, a low end mobile device may not be capable of handling multiple media streams.

4. Device power consumption for the meshed user. (D3)

For endpoints that are mobile devices, the power which can consumed for computation may also be limited.

5. Mobility of the device for the meshed user. (M)

Where endpoints are mobile devices, network routing and network address translation traversals also can change during the call. These can trigger significant Session Description Protocol (SDP) renegotiation between participants, which can create bad experiences for some users.

5. Bridge user joins (B)

If a bridge user wants to the join a conference call that is currently running in a meshed based conference call.

The triggering point may be considered a function of all the above criteria. These criteria are illustrative and by way of example only, and other criteria may be defined and used as desired. Although multiple criteria are described above, a single criterion, such as the number of participants, may be used if desired.

Triggering point=F (N, D1, D2, D3, M, B)

The function may be a simple weighted index or any other mathematical model which may be configured in the system.

To implement such a system in one embodiment, a conference monitor may collect the metrics from the endpoint device using agents or in an agentless way. The conference monitor may run real-time analytics on the metrics data received from the endpoint devices and calculate the triggering point value F(N, D1, D2, D3, M, B). If the calculated triggering point value meets or exceeds a predetermined configurable threshold value, the conference monitor may trigger escalation to a bridge call. Other relationships between the calculated triggering point and the threshold value may be used as desired.

In one embodiment, the function used to determine the triggering point and the threshold may be customizable. Different functions and thresholds may be assigned to different conferences as desired. For example, some functions may weight the various parameters, giving different weights to different parameters as desired. Other functions may omit one or more of the above parameters, and may include one or more other parameters not described above. Based on the criteria used and the weighting of the parameters, an optimal threshold for a triggering point may be identified for each conference session.

In addition to defining a triggering point function that is more robust that merely counting the number of participants, the disclosed system provides a better user experience because the escalation of the meshed call to the bridged call is seamless, performing the escalation without breaking the existing conversation.

FIG. 1 is a flowchart illustrating a technique 100 according to one embodiment NAT outlined above. In block 110, each conference is assigned a triggering point function and a triggering point threshold. Different conferences may employ different functions and thresholds. In some embodiments, the function or threshold may be changed as desired during an active conference. In block 120, metrics relevant to the triggering point function are obtained from the endpoints in the conference. Metrics regarding network capacity and quality are also obtained. The metrics may be collected with or without the use of agents, and some embodiments may use agents for collecting some metrics and not use agents for collecting other metrics. In block 130, the triggering point function is evaluated, in this example applying metric data for the number of participants, device bandwidth limitations, device computational limitations, mobility of the devices, and bridge users. In block 140, the triggering point function value is evaluated against the threshold value. If the threshold is passed (or, in some embodiments, met), the conference is triggered to escalate to a bridged conference in block 160. If the triggering point value does not pass (or meet) the threshold value, then in block 150 a check is made to determine whether the conference has ended. If not, then the technique repeats, beginning with the collection of metrics in block 120. If the conference has ended then the technique finishes.

We now turn to a technique for performing the escalation that is triggered by the evaluation of a triggering function such as the triggering function described above or based on any other triggering technique. In the following, the triggering function for clarity is devolved to a simple function of the number of participants, and the threshold is a number of participants N. However, the following escalation technique is not limited to such a "number of participants" function.

Consider a meshed-based conference call with a threshold of N participants where currently there are N−1 active participants. When a new participant joins the conference call, the call needs to be escalated to a bridge call. This transition may be handled by an escalation manager.

When a new participant tries to join the meshed conference call as a participant, the escalation manager redirects the new participant to a bridge directly. The escalation manager itself then joins the meshed conference as the Nth participant on the mesh side of the escalation manager with the MCU or bridge on the other side of the escalation manager. Over time, the call may move the meshed participants from the mesh side to the bridge side without interruption, providing for a seamless transition to a bridge conference.

Figure 2:
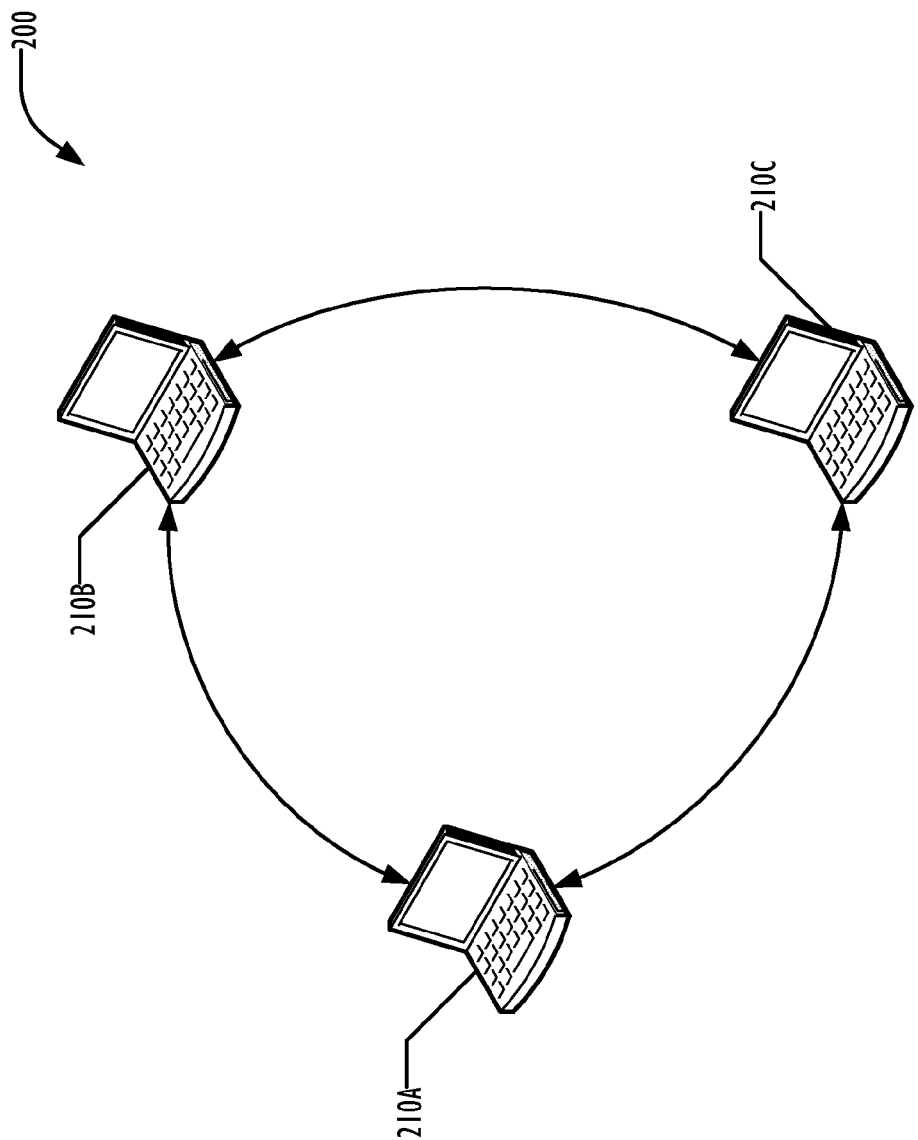
FIG. 2 is a block diagram illustrating a mesh-based conference according to one embodiment.

FIG. 2 is a block diagram illustrating a mesh-based conference session 200 among three endpoints 210A-C according to one embodiment. In this simple example, the threshold for triggering an escalation to a bridge conference is 4 participants and meeting the threshold triggers the escalation. Alternately, the threshold value may be 3 participants, and exceeding that threshold triggers the escalation. Although illustrated as laptop computers in FIG. 1, the endpoints 210 may be any type of computational device, including mobile devices. The endpoints 210 are connected to each other via network connections across one or multiple networks, which may include cellular networks.

Figure 3:
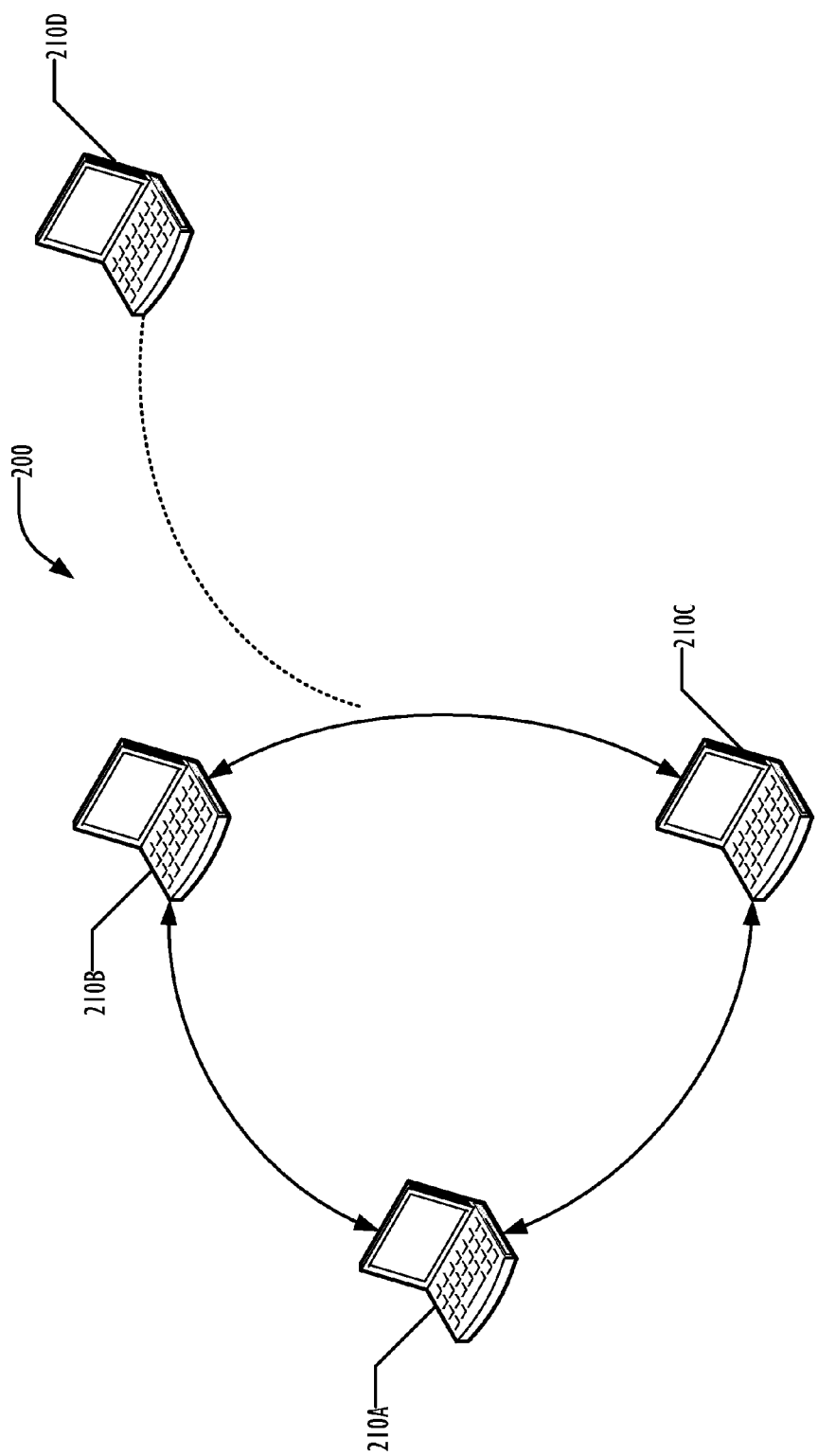
FIG. 3 is a block diagram illustrating another endpoint attempting to join the conference of FIG. 2.
Figure 4:
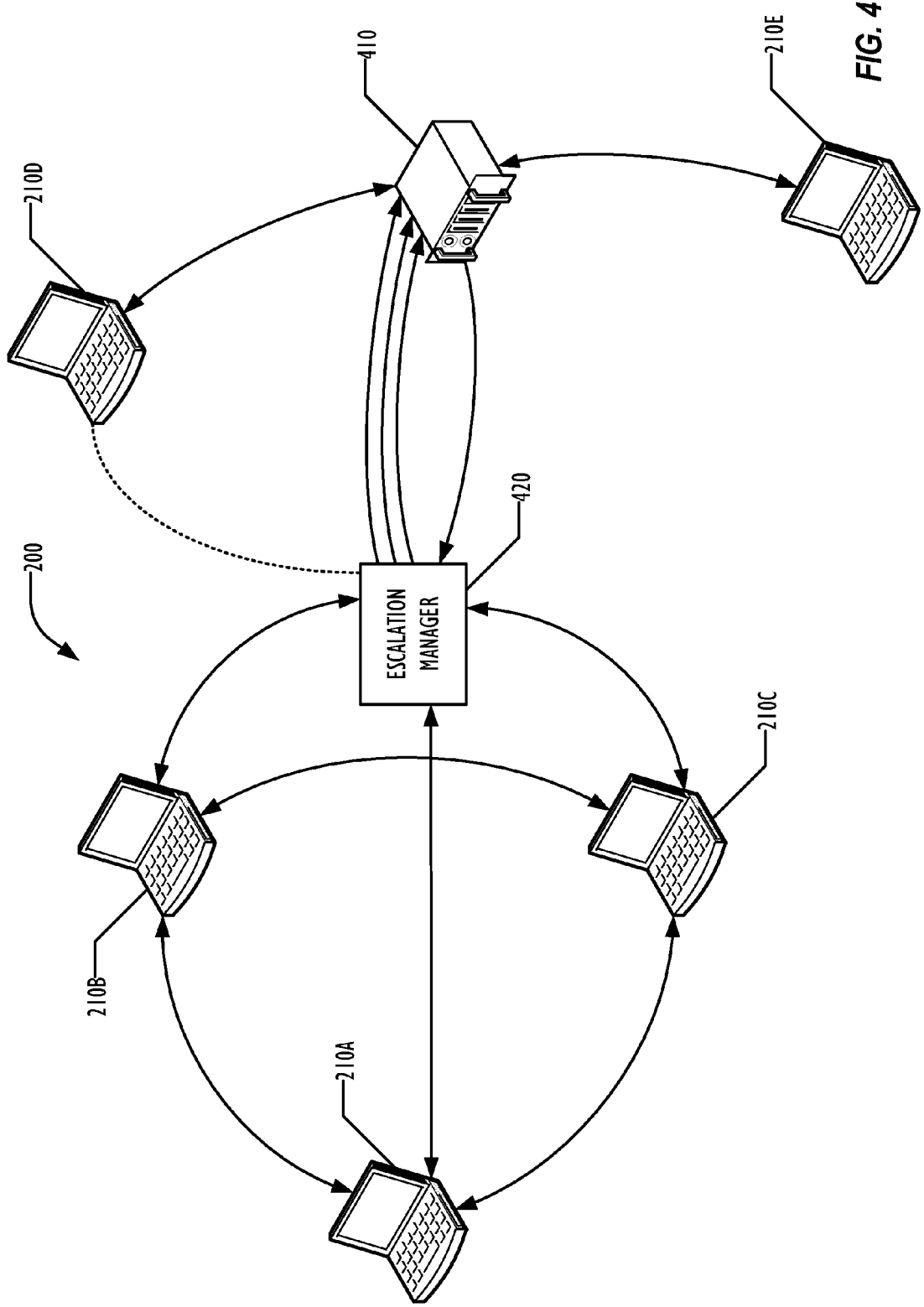
FIG. 4 is a block diagram illustrating use of an escalation manager according to one embodiment for managing the escalation of the mesh-based conference of FIG. 2 to a bridged conference.
Figure 5:
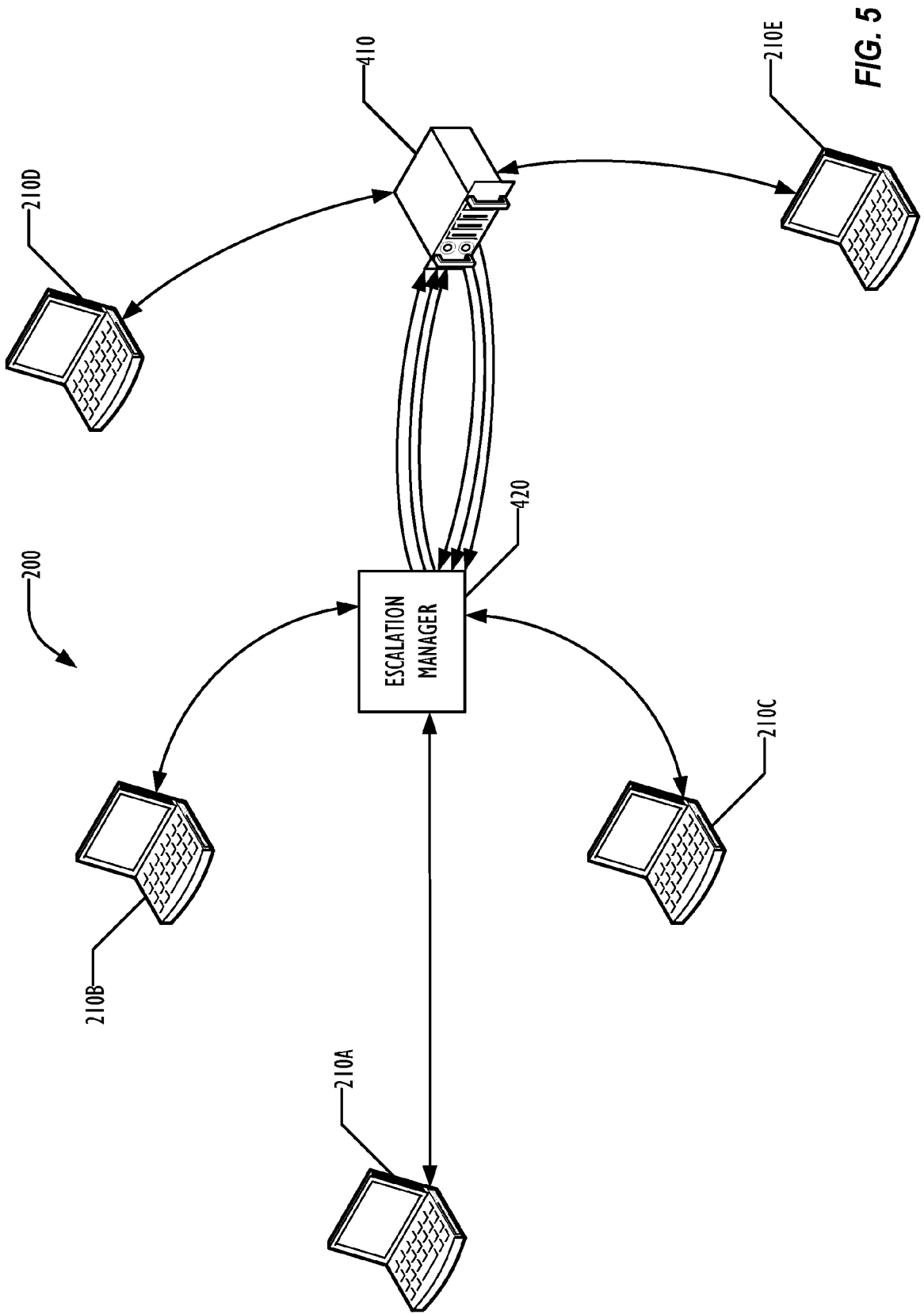
FIG. 5 is a block diagram of the conference of FIG. 4, transitioned to a fully bridged conference according to one embodiment.

In FIG. 3, new participant 210D attempts to join the conference session 200, which would bring the conference to the threshold number of participants. In this embodiment, an escalation manager comes into play as illustrated in FIGS. 4 and 5.

Endpoint 210D contacts the escalation manager 420, indicating a desire to join the conference with endpoints 210A-C. The escalation manager 420 directs endpoint 210D to connect to MCU 410, and establishes a connection between the endpoint manager 420 and the MCU 410. The escalation manager 420 also makes mesh connections with the other three endpoints in the mesh conference, so that the conference 200 is now a 4-way mesh conference. In some embodiments, the escalation manager 420 may perform other functionality for the conference 200, in addition to the escalation functions.

On the bridge side of the call, the escalation manager 420 sends to the MCU 410 the multiple media streams received or gathered from all the other N−1 conference participants 210A-C in the meshed call. The MCU 410 sends a composed or stitched media stream of all the meshed conference participants media to the newly added participant 210D. Although only a single stream between endpoint 210D and MCU 410 is illustrated in FIG. 4, embodiments may send more than one stream as desired. In some embodiments, the stitched media stream may include segments from less than all of the other endpoints 210A-C as desired. The MCU 410 also sends back to the escalation manager 420 a media stream from endpoint 210D (the N+1st participant). The escalation manager 420 then forks the stream to all the meshed call participants 210A-C. In one embodiment, the escalation manager 420 adds a specific token for each media stream sent to the MCU 410, so that the MCU 410 considers the streams as media from single source, and indicating the MCU 410 should not send the stream from escalation manager 420 back in the stitched video stream to the endpoints 210A-C.

If yet another participant (in FIG. 4, endpoint 210E) joins the conference 200, that endpoint joins via the bridge 410 only. In one embodiment, the MCU 410 sends an additional media stream to the escalation manager 420 for each endpoint connected directly to the bridge 410. In other embodiments, a single media stream is sent from the MCU 410 to the escalation manager, combining media streams from each of the participants connected directly to the bridge MCU 410.

The conference then continues as a mixed mesh-bridge conference. In one embodiment, the escalation manager 420 can decide if the entire meshed conference needs to move onto the MCU 410, using a triggering technique similar to the triggering technique described above.

In one embodiment, the escalation manager slowly stops the peer-to-peer media flow between meshed endpoints 210A-C, while directing or requesting the MCU 410 to add additional media streams for each endpoint 210A-C that drops mesh connections, as illustrated in FIG. 5. In such an embodiment, the escalation manager 420 may then function as a media relay MCU, relaying media streams to and from the MCU 410 as a proxy.

In one embodiment, the escalation manager 420 can monitor the conference, listening for active speakers. The escalation manager 420 may trigger a sequence for endpoints corresponding to non-active speakers to drop their meshed connections. The escalation manager 420 also sends a notification to MCU 410, to cause the MCU 410 to start sending a separate stream intended for the endpoint 210 that is no longer part of the mesh. By snapping only non-active speaker endpoints from mesh to bridge conference connections, the conference transition appears seamless to the participant at the endpoint 210 whose connection has switched from mesh to bridged. Over time, this may result in the situation illustrated in FIG. 5, in which all of the formerly meshed endpoints 210A-C are connected as bridged endpoints via the escalation manager 420.

Figure 6:
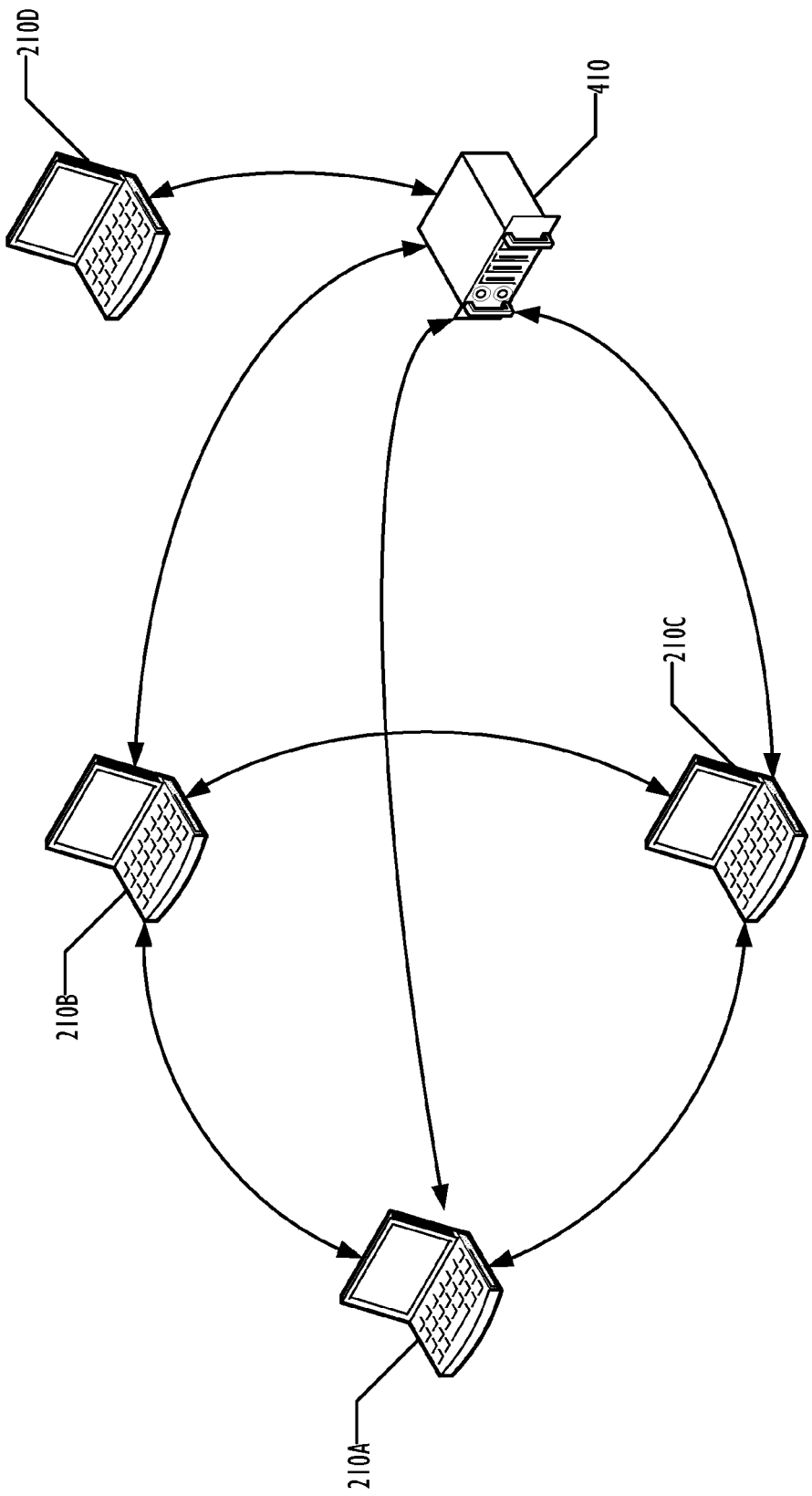
FIG. 6 is a block diagram of a mesh-based conference in transition to a bridged conference according to one embodiment.
Figure 7:
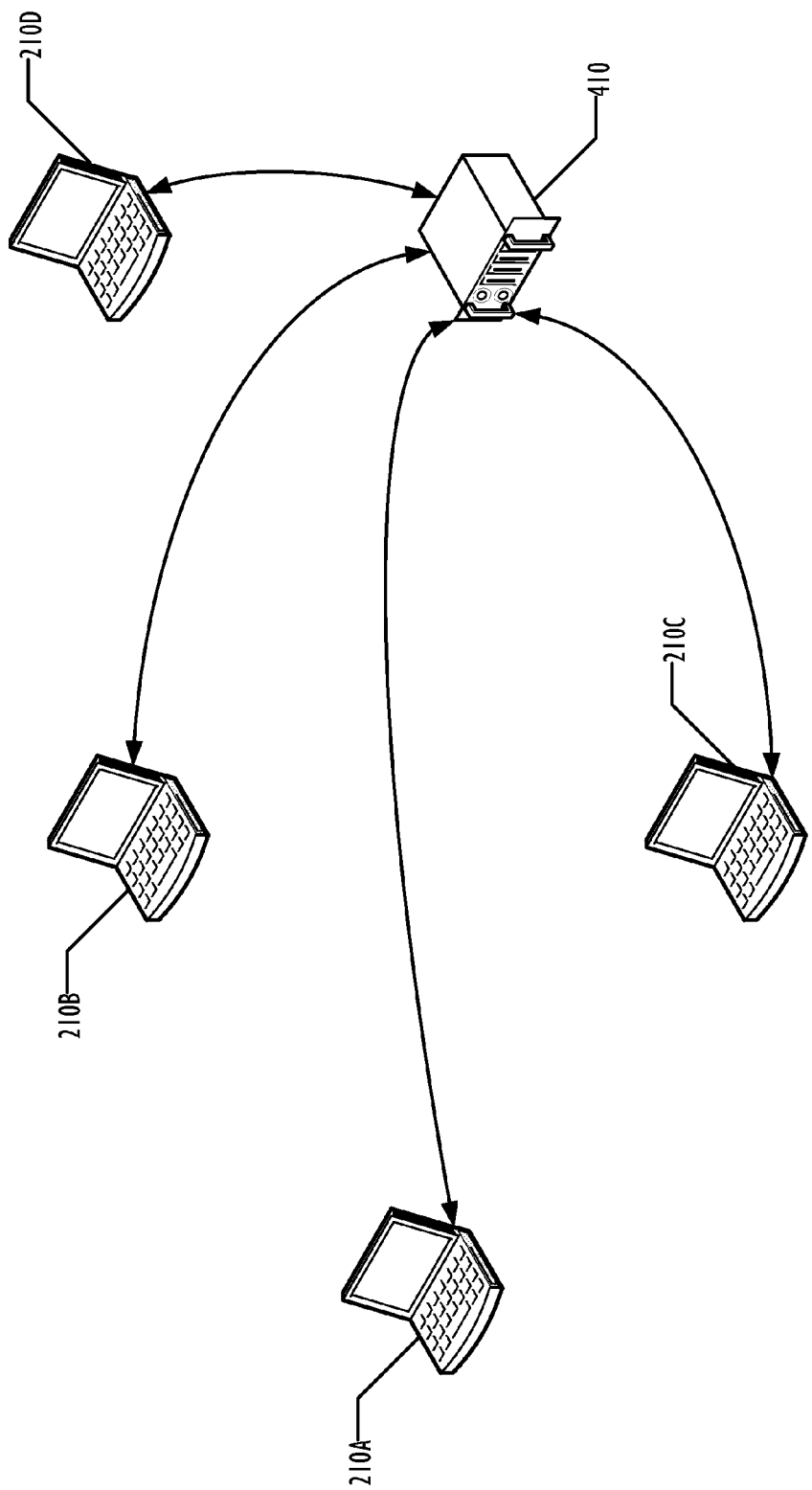
FIG. 7 is a block diagram of the conference of FIG. 6 after transitioning to a bridged conference.

In another embodiment, illustrated in FIGS. 6-7, escalation manager 420 is not used to relay media streams and may be omitted. In one embodiment, instead of escalation logic in a separate escalation manager 420, escalation logic is implemented in each of the endpoints 210A-D. In another embodiment, an escalation manager 420 may be used, but serves to direct the endpoints 210 and MCU 410 to perform the escalation, without serving as a relay for streams. The conference starts out as a meshed conference as illustrated in FIG. 2. But in this embodiment, when endpoint 210D attempts to join the conference, escalation logic in each of the endpoints causes the MCU 410 to join the mesh conference as the Nth participant and endpoint 210D to join the conference as the N+1$^{st}$ endpoint directly on the MCU 410, as illustrated in FIG. 5.

Then, over time when each of endpoints 210A-C is not an active speaker, that endpoint 210 drops its mesh connections to the other endpoints 210, and communicates only through the MCU 410, eventually resulting in the fully bridged conference of FIG. 7.

As illustrated in FIG. 6, all the current mesh-based conference participants 210A-C dial into the bridge MCU 410 while keeping their meshed call legs up and running. This ensures that the running conversation is not broken.

In one embodiment, the call to join the MCU 410 may contain a specific flag or identifier which will enables the MCU 410 to consider all the media coming from the original N−1 participants, endpoints 210A-C, as media coming from a special source that is treated logically as a single entity. In this embodiment, the media stream sent by the MCU 410 to the mesh-based participant endpoints 210A-C does not contain any audio or video of the meshed endpoints 210A-C, but only media from the participants that have joined the conference call directly on the MCU 410.

On the other hand, endpoint 210D, which is hosted on the MCU 410, receives media streams from the MCU 410 from all of the meshed conference participants 210A-C and any other bridge-connected participant.

Similar to the transition illustrated in FIGS. 4-5, as the conference progresses, at a given point of time there may be a subset m of the N participants that active speakers. Leaving the m active speakers untouched, escalation logic in the endpoints 210A-C can remove the rest of the other N-m participants from the meshed call. In one embodiment, this is performed sequentially, one by one, by the following procedure.

First, the existing peer-to-peer connection legs (with meshed users) are removed for an endpoint 210 that is to transition to fully-bridged mode. Next, a notification is sent to the MCU 410 to remove that participant from the single source context, so that the MCU sends the endpoint 210 media for all the other participants in the conference, not just the bridge-only participants.

After applying the above steps, endpoints 210 without active speakers may transition smoothly to the MCU 410 by simply turning off their meshed connections and detaching from the common source context.

In one embodiment, all the meshed users join the call on the MCU 410 with a special key (shared in Session Initiation Protocol or Session Description Protocol), that enables the MCU 410 to keep the Real-Time Protocol (RTP) media streams coming from meshed endpoints 210 into a single source.

By keeping RTP into the same context/source, while stitching the media, the MCU 410 does not send media in the stitched stream back to the meshed participants.

For example, using the example illustrated in FIGS. 6-7, endpoints 210A-C are on the meshed call; thus, they are directly getting media streams from each other. When endpoint 210D joins the call on the MCU 410, escalation happens and endpoints 210A-C send an SDP Invite to MCU 410 containing their audio video ports. In this Invite, endpoints 210A-C share a common key, allowing the MCU 410 to consider the RTP media streams coming from these endpoints as a RTP stream coming from a single source. Therefore, the MCU 410 does not send the stitched media back to the endpoints 210A-C, preventing echoing their streams back to the meshed endpoints 210A-C that are still talking to each other over their mesh connections.

New participant endpoint 210D, however, gets the media from all the meshed endpoints 210A-C and all the meshed endpoints 210A-C get media from endpoint 210D as a conference participant in the stitched video coming back to the endpoints 210A-C from the MCU 410. When any of the endpoints 210A-C transitions from mesh to bridged connections, the media stream from that endpoint 210 no longer contains the special key, causing the MCU 410 to include media from that endpoint 210 in the stitched media stream. Once that happens, the endpoints 210 may simply drop their mesh connections.

The escalation logic described above, whether implemented as escalation manager 420 or as escalation logic of an endpoint 210, may be constructed and implemented in either software, hardware, firmware, or any combination thereof.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, tangible, non-transitory memories such as solid-state memories, optical and magnetic disks. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. An videoconferencing system, comprising:
   a multipoint control unit; and
   an escalation manager, communicatively coupled to the multipoint control unit via a network, configured to:
      receive media streams from meshed endpoints of a videoconference;
      receive a request to join the videoconference from another endpoint; and
      responsive to an evaluation of triggering point criteria, connect the escalation manager to the videoconference;
         direct the multipoint control unit to connect to the videoconference via the escalation manager;
         direct the another endpoint to connect to the videoconference via the multipoint control unit; and
         direct meshed endpoints to drop connections to other meshed endpoints.

2. The videoconferencing system of claim 1, wherein the escalation manager is further configured to:
   direct meshed endpoints to make a connection to the videoconference via the multipoint control unit prior to dropping connections to other meshed endpoints.

3. The videoconferencing system of claim 1, wherein the triggering point criteria comprise one or more of:
   a number of participants;
   an endpoint bandwidth;
   an endpoint computational capacity;
   an endpoint power consumption;
   an endpoint mobility; and
   whether a bridged endpoint attempts to join the videoconference.

4. The videoconferencing system of claim 1, wherein the escalation manager is configured to:
   evaluate a function of the triggering point criteria; and
   compare a result of the function to a predetermined threshold value.

5. The videoconferencing system of claim 4, wherein the function of the triggering point criteria is a weighted function of the triggering point criteria.

6. The videoconferencing system of claim 1, wherein the escalation manage is further configured to:
   forward media streams from the meshed endpoints to the multipoint control unit; and
   forward media streams from the multipoint control unit to the meshed endpoints.

7. A videoconferencing endpoint, comprising:
   a network interface, adapted for transmitting and receiving media streams; and
   an escalation logic, configured to transition the endpoint from a mesh-based connection to a videoconference to a bridged connection to the videoconference,
   wherein the escalation logic is further configured to:
      evaluate a triggering point function;
      responsive to the triggering point function,
         connect to a multipoint control unit; and
         drop mesh connections to other endpoints of the videoconference after connecting to the multipoint control unit, responsive to a determination that no speaker is active at the videoconferencing endpoint.

8. The videoconferencing endpoint of claim 7, wherein the triggering point function comprises a function that evaluates criteria, the criteria comprising one or more of:
   a number of participants;
   an endpoint bandwidth;
   an endpoint computational capacity;
   an endpoint power consumption;
   an endpoint mobility; and
   whether a bridged endpoint attempts to join the videoconference.

9. The videoconferencing endpoint of claim 7, wherein the escalation logic is further configured to:
   add a token to a media stream sent from the videoconferencing endpoint to the multipoint control unit, the token indicating to the multipoint control unit not to send the media stream back to the videoconferencing endpoint.

10. The videoconferencing endpoint of claim 7, further comprising:
    logic to receive a stitched media stream from the multipoint control unit, composed from streams from endpoints bridged via the multipoint control unit.

11. The videoconferencing endpoint of claim 7, wherein the escalation logic causes the videoconferencing endpoint to establish mesh connections to other videoconferencing endpoints responsive to the triggering point function having a predetermined relationship to a predetermined threshold value.

12. A method of triggering escalation of a videoconference from meshed to bridged, comprising:
   collecting metrics from each endpoint in the videoconference, comprising one or more of:
      counting endpoints in the videoconference;
      determining device bandwidth limitations for each endpoint;
      determining device computational limitations for each endpoint;
      determining device power consumption constraints for each endpoint; and
      determining whether each endpoint is a mobile device; and
   transitioning the videoconference from a meshed videoconference to a bridged videoconference responsive to comparison of a threshold value with an evaluation of a function of the collected metrics, comprising:
      connecting an escalation manager to each meshed endpoint in the videoconference;
      receiving media streams from each meshed endpoint in the videoconference;
      forwarding the media streams to a multipoint control unit; and
      instructing a first meshed endpoint to disconnect from other meshed endpoints in the videoconference after connecting to the escalation manager.

13. The method of claim 12, wherein transitioning the videoconference comprises:
   instructing an endpoint attempting to join the videoconference to connect via a multipoint control unit, responsive to the comparison.

14. The method of claim 12, wherein transitioning the videoconference comprises:
   inserting a token into media streams received by escalation manager from the meshed endpoints in the videoconference, the token indicating to the multipoint control unit not to return the media streams received from the escalation manager to the escalation manager.

15. The method of claim 12, wherein transitioning the videoconference further comprises:
   instructing a first meshed endpoint to disconnect from the other meshed endpoints responsive to a determination that no speaker is active at the first meshed endpoint.

16. The method of claim 12, wherein transitioning the videoconference further comprises:
   detecting an attempt to join the videoconference by an endpoint; and
   evaluating the collected metrics responsive to the detection.

* * * * *